United States Patent [19]
Janky et al.

[11] Patent Number: 5,625,556
[45] Date of Patent: Apr. 29, 1997

[54] ACCURATE TIME STANDARD FOR VEHICLE OPERATION

[75] Inventors: James M. Janky, Los Altos; John F. Schipper, Palo Alto, both of Calif.

[73] Assignee: Trimble Navigation Limited, Sunnyvale, Calif.

[21] Appl. No.: 430,495

[22] Filed: Apr. 28, 1995

[51] Int. Cl.$^6$ ............................ G04C 11/00; G01S 1/24
[52] U.S. Cl. ........................ 364/423.09; 342/357; 368/47
[58] Field of Search ............................... 364/424.01, 449, 364/569; 342/357, 457; 368/47

[56] References Cited

U.S. PATENT DOCUMENTS

| | | | |
|---|---|---|---|
| 5,247,440 | 9/1993 | Capurka et al. | 364/424.05 |
| 5,319,374 | 6/1994 | Desai et al. | 342/387 |
| 5,510,797 | 4/1996 | Abraham et al. | 342/352 |
| 5,521,887 | 5/1996 | Loomis | 368/47 |

*Primary Examiner*—Michael Zanelli
*Attorney, Agent, or Firm*—John Schipper

[57] ABSTRACT

Apparatus and method for providing timing control signals for operation of an engine and other devices on a vehicle and/or operation of telecommunications equipment and/or computer equipment on the vehicle. A Satellite Positioning System (SATPS) antenna and receiver/processor receive and process signals from three or more SATPS satellites and determine and issue SATPS-determined timing pulses and time signals that indicate the time associated with each timing pulse. The pulse-to-pulse time separation $\Delta t_{pp}$ of these timing pulses is adjusted to provide a separation approximately equal to a selected pulse separation $\Delta t_{incr}$. Alternatively, a supplementary timing device provides a sequence of timing pulses with pulse-to-pulse spacing that is adjustable by varying an environmental parameter $\theta$, such as temperature or electrical field, for this timing device. The supplementary timing device pulse-to-pulse separation is determined by the SATPS-determined time signals and the environmental parameter $\theta$ is varied so that $\Delta t_{pp}$ becomes approximately equal to a selected value $\Delta t_{incr}$ that can be used for timing signals on the vehicle. The supplementary timing device pulses can also be used where the SATPS-determined time signals and timing pulses are not available. The SATPS may be a Global Positioning System (GPS), a Global Orbiting Navigational Satellite System (GLONASS) or any other suitable satellite-based system.

25 Claims, 6 Drawing Sheets

ACCURATE TIME STANDARD FOR VEHICLE OPERATION

FIELD OF THE INVENTION

This invention relates to systems for providing accurate timing signals for operating a vehicle as the vehicle moves from one location to another location anywhere on or adjacent to the Earth's surface.

BACKGROUND OF THE INVENTION

Historically, timing of operations of a vehicle was relatively relaxed, primarily involving a few activities such as provision of a vehicle "clock time" (notoriously inaccurate) and provision of timing signals for an internal combustion engine. With the introduction of vehicle operating features such as fuel injection for the engine and telecommunications capability for the vehicle occupants, timing is now a central concern and the margin for timing error is reduced from tenths or hundredths of a second to microseconds. Further, a vehicle that operates according to a firm route and/or time schedule may require receipt of a sequence of timing signals with uniform, unvarying time intervals. The source of timing signals for a vehicle may now provide timing signals that are measured in smaller time units, but the source may not always provide these signals with uniform time interval widths. This timing signal source may slowly degrade, relative to an ideal, unvarying timing standard, because of (1) time drift and offset associated with the source components, (2) power fade as the source power supply nears the end of its present power cycle or nears the end of its life. When this occurs, instruments such as fuel injection modules and synchronous and asynchronous telecommunications equipment installed on the vehicle may function erratically at times. Adoption or termination of daylight saving time in the local zone where the vehicle usually operates can also affect some uses of the installed telecommunications equipment, where the local time in another zone is assumed to bear a fixed relationship to the local time for the vehicle.

Some workers have attempted to distribute timing signals for two or more computers or peripherals, using an internal clock or an external clock, which is subject to drift.

U.S. Pat. No. 3,520,128, issued to Novikov et al, discloses an automatic time distribution system. An independent primary clock is connected to, and provides exact time signals for, a plurality of secondary clocks by radio waves. Each secondary clock receives a sequence of uncorrected "exact" time signals and a sequence of timing marks to correct this uncorrected time. The time signals for each secondary clock are apparently corrected separately.

Entner discloses an aircraft navigation system that employs time synchronization provided by satellite-ground communications, in U.S. Pat. No. 3,643,259. A ground-based observation station monitors and predicts the future positions of a single satellite orbiting the Earth and transmits this information to the satellite, which receives and stores this information. The satellite and an aircraft, for which navigation information is to be supplied, have precise on-board clocks, synchronized with each other. The aircraft transmits a first pulse, which is received by the satellite after a time interval $\Delta t1$, and causes the satellite to transmit a second pulse, which is received by the aircraft after a further time interval $\Delta t2$. The total time difference $\Delta t1+\Delta t2$ between transmission of the first pulse and receipt of the second pulse at the aircraft determines the distance travelled by the first pulse. The aircraft generates a first sphere, whose radius is the distance travelled by the satellite signal to the aircraft, and a second sphere, whose center is displaced from the first sphere center by the distance travelled by the aircraft in the time interval of length $\Delta t1$. A third sphere is generated in a manner similar to generation of the first sphere. The (point) intersection of the three spherical surfaces determines the position of the satellite, and the location of the aircraft relative to the satellite is then determined.

Cater, in U.S. Pat. No. 3,811,265, discloses transmission of coded, time-indicating signals from a master clock at a central station to one or more slave clocks, using a two-wire line and binary-valued pulses with different time durations. A time synchronizing pulse is periodically inserted (e.g., once per second) on the line to correct for drift or other errors. If the two-wire line is a standard 60-cycle power line or a television cable, the binary-valued pulses use one or more frequencies that lie outside the frequency range normally used on that line, to avoid signal interference with the standard signals transmitted over that line.

A clock that can be synchronized by "wireless" signals is disclosed by Gerum et al in U.S. Pat. No. 3,881,310. The clock contains an electromagnetically operated mechanical oscillator whose frequency $2f0$ is twice the rated frequency of an alternating current network connected to the clock. A time synchronization module transmits a signal of frequency $f1 \gg f0$ that is modulated by the network at a frequency $f=2f0$ and is received and demodulated by the clock. Normally, the pulses received from the network drive the clock, and the oscillator is in a standby mode. The clock oscillator is enabled, and the network is disconnected, when and only when the network frequency differs by at least a predetermined amount from the frequency $2f0$ of the oscillator. The oscillator in standby mode receives resonance energy of frequency $\approx 2f0$ from the network for maintaining the oscillations.

A TACAN air navigation system is disclosed in U.S. Pat. No. 3,969,616, issued to Mimken. Range of an aircraft from an interrogation signal-transmitting beacon is determined by the lapse in time between transmission of the interrogation signal and receipt of a reply pulse signal from the aircraft (called a "dwell" period in TACAN parlance). A circuit at the beacon generates and uses a filler pulse during any dwell period in which a reply pulse is not received from a target aircraft, in order to maintain a rough and unspecified synchronization at the beacon for the target aircraft when reply pulses are not received. An aircraft velocity detector may be included, with velocity being determined by averaging over several successive dwell periods to reduce the associated velocity error.

Cateora et al, in U.S. Pat. No. 4,014,166, disclose a satellite-controlled digital clock system for maintaining time synchronization. A coded message containing the present time and satellite position is transmitted from a ground station to an orbiting satellite and is relayed to a group of ground-based receivers. A local oscillator aboard the satellite is phase-locked to a precise frequency to provide the system with accurate time-of-year information by a count of the accumulated pulses produced by the oscillator. This count is compared with a time count determined from the coded message received by the satellite. After a selected number of errors are observed through such comparisons, the on-board clock is reset to the time indicated by the coded messages received. If transmission of the coded messages is interrupted, the on-board oscillator continues to provide time information that is transmitted to the ground-based receivers.

An antenna space diversity system for TDMA communication with a satellite is disclosed by U.S. Pat. No. 4,218, 654, issued to Ogawa et al. Differences of temporal lengths of paths from the satellite through each antenna to a ground-based signal processor station are determined by measurement of times required for receipt of pre-transmission bursts sent in the respective allocated time slots through two different antennas, in a round trip from base station to satellite to base station. Variable time delays are then inserted in the base station signal processing circuits to compensate for the temporal length differences for the different signal paths. These time delays are changed as the satellite position changes relative to each of the antennas.

U.S. Pat. No. 4,287,597, issued to Paynter et al, discloses receipt of coded time and date signal from two geosynchronous satellites, which signals are then converted into local date and time and displayed. The frequency spectrum is scanned by an antenna to identify and receive the satellite signals. Temporal length differences for signal paths from each satellite through a receiving antenna to a signal processing base station are determined, to provide compensation at the base station for these differences. Time information is provided by a satellite every 0.5 seconds, and this information is corrected every 30 seconds. Signals from either or both satellites are used to provide the time and date information, in normal local time and/or daylight savings local time.

Jueneman discloses an open loop TDMA communications system for spacecraft in U.S. Pat. No. 4,292,683. A spacecraft, such as a satellite, in quasi-geosynchronous orbit carries a transponder that relays a coded signal from a ground-based signal-transmitting station to a plurality of spaced apart, ground-based receivers. This coded signal includes a time index and an index indicating the spacecraft's present position. The time index is adjusted by each receiver to compensate for the changing position of the spacecraft through which the coded signal is relayed. The system is open loop and requires no feedback from the receivers to the base station.

Method and apparatus for determining the elapsed time between an initiating event and some other event are disclosed by U.S. Pat. No. 4,449,830, issued to Bulgier. A first timer and a second time mark the times of occurrence, respectively, of an initiating event and a subsequent event that depends upon occurrence of the initiating event. The two timers are initially connected and synchronized, then disconnected before the initiating event occurs. The timers are then reconnected after both events have occurred, to allow determination of the elapsed time between occurrence of the two events.

Distance ranging and time synchronization between a pair of satellites is disclosed by Schwartz in U.S. Pat. No. 4,494,211. Each satellite transmits a timing signal and receives a timing signal from the other satellite. The difference in time, including compensation for signal processing delay on a satellite, between transmission and receipt of the signals is transmitted by each satellite to the other satellite and is used to establish time synchronization and to determine the distance between the two satellites. This exchange of signals would be repeated at selected time intervals to maintain synchronization, where the satellites are moving relative to each other. No communications link to a third entity is required, and only one of the satellite clocks is adjusted to establish and maintain time synchronization.

Plangger et al, in U.S. Pat. No. 4,582,434, disclose transmission and receipt of a continuously corrected sequence of timing signals. A microprocessor at the receiver periodically compares these timing signals with on-board timing signals generated by a local clock. A varactor diode in a crystal oscillator circuit adjusts the microprocessor's operating frequency to minimize, but not necessarily eliminate, any error between the two timing signal sequences. Delay time for timing signal processing is compensated for in a receiver circuit. The frequency for microprocessor operation is continuously corrected. If the transmitted timing signals are too weak, or do not arrive, the on-board timing signals are used to control the microprocessor until the transmitted timing signals are received in sufficient strength again. This approach uses Greenwich Mean Time, updated approximately once per minute to reduce the timing inaccuracy to a maximum of 0.1 sec.

Noguchi discloses a remote time calibration system using a satellite, in U.S. Pat. No. 4,607,257. A base station provides a reference system of absolute timing signals and transmits these to a satellite that orbits the Earth. The satellite then calibrates and periodically adjusts its internally generated time and transmits observed data plus the corresponding adjusted satellite time to one or more data receiving stations on the Earth that are distinct from the base station. Time calibration optionally compensates for signal propagation time delay from base station to satellite and allows continuous transmission of data from satellite to the data receiving station(s). Several time difference indicia are computed here.

A local area network, having a master timing subsystem and having a plurality of modules, each with a separate timing subsystem, is disclosed by Kirk in U.S. Pat. No. 4,890,222. Each timing subsystem has three timing sequences(fine resolution, synchronization, and present time to the nearest second), each having a different period. Each module timing subsystem can independently provide timing signals for its associated module, or timing signals for all modules can be synchronized by the master timing subsystem. A master timing frame is periodically transmitted by the master timing subsystem to each of the modules; this master timing frame is received and used by each module as its sole timing signal source only if certain conditions are present.

Lusignan, in U.S. Pat. No. 4,972,507, discloses a cellular communications protocol and system in which a plurality of user station respond to transmission command from a base station. The response intervals for each user station are staggered and synchronized so that no overlap occurs between transmissions from different user stations. A unique time delay for each user station is assigned and broadcast by the base station at selected times. However, the base station does not continually provide a sequence of timing signals for synchronization of the user station times inter se.

A time slot allocation method for in a TDMA or similar network is disclosed in U.S. Pat. No. 5,062,035, issued to Tanimoto et al. Time is synchronized, and time slots are allocated and re-allocated, by a master station that communicates directly with each subsidiary station. If the number of reserve or unused time slots of a subsidiary station (1) falls below a first threshold or (2) rises above a second threshold, the master station (1) supplements the time slots of that subsidiary station with one or more of its own time slots or (2) re-allocates to itself one or more time slots from that subsidiary station, respectively. This approach reduces the wait time for signal transmission on the network.

U.S. Pat. No. 5,072,442, issued to Todd, discloses a teleconferencing network in which the stations, operating at different clock rates, can communicate with each other synchronously. A TDMA bus connecting the stations operates at a clock rate equal to the number of stations times the highest clock rate for all the stations, divided by the bit width of the TDMA bus. Buffers are used to receive and hold signals for transmission and/or processing. This approach appears to require redetermination of the bus rate each time the number of network stations changes.

A phase adjustment system for communication between a central station and a plurality of transmitter-receiver pairs is disclosed by Nakahara in U.S. Pat. No. 5,077,759. A target transmitter identification number is transmitted as part of a turn-on signal by the central station, received by the associated receiver, received by the target transmitter from that receiver after a selected time delay, and transmitted to the central station. The central station then adjusts the time delay of each transmitter-receiver pair to achieve a chosen phase relationship of the transmitter-receiver pairs relative to the central station.

Durboraw, in U.S. Pat. No. 5,119,504, discloses use of GPS to assign a mobile, ground-based receiver of GPS signals to a "cell", defined by one or more GPS satellites, on the Earth's surface for communications purposes. The ephemerides for the satellites are stored in the receiver, or in a ground-based system with which the receiver communicates. This patent appears to contemplate two-way communication between a satellite and the receiver provide receiver timing information and to implement receiver hand-offs between cells.

In U.S. Pat. No. 5,155,490, Spradley et al disclose use of GPS time to correct clock drift and offset at a network of fixed base stations, whose locations are known with high accuracy, and to then determine the location of an adjacent vehicle that is moving among this network of base stations.

A system for determining a sequence of Universal Coordinated Times from Loran signals received from a plurality of ground-based Loran signal transmitters is disclosed by Penrod in U.S. Pat. No. 5,220,333. The timing accuracy obtained here may not be sufficient to provide timing signals for telecommunications equipment and/or computers.

Brown et al, in U.S. Pat. No. 5,225,842, disclose a vehicle tracking system for providing vehicle location, velocity and time information from a stationary GPS signal processor that receives GPS signal information that is relayed by a GPS signal sensor located on the vehicle. Most or all of the GPS signal processing is performed at the stationary GPS signal processor and is stored there for future reference.

U.S. Pat. No. 5,280,629, issued to LoGalbo et al, discloses a technique for measuring time consumed for signal propagation in a communication channel. Each of two spaced apart sites receives GPS signal information that determines the location and synchronized observation time for that site. The transmitting site sends a signal, including time of transmission, to the second site. The second site receives this signal, determines time of receipt of this signal and determines the time required for signal propagation between the two sites.

A method for sequential data transmission by radiowaves in assigned time slots is disclosed by Rideout et al in U.S. Pat. No. 5,367,524. Each transmitter uses GPS-determined time to synchronize its signal transmission, in its assigned time slot, to a central station.

These approaches do not provide a time distribution system that is substantially the same for all points on the Earth's surface and do not continually provide corrections to the timing signals issued to and used by the recipient instruments. Further, these approaches are often quite specialized and are therefore difficult to extend to an arbitrary number of instruments or other users. What is needed is a time distribution system that (1) is usable anywhere on or adjacent to the Earth's surface; (2) is easily extended to any number of time-controlled instruments or other users; (3) continually provides corrections in the timing signals distributed; (4) can provide periodic timing signals and/or special event timing signals on demand; and (5) operates independently of the number of users.

SUMMARY OF THE INVENTION

These needs are met by the invention, which provides a system for generating and distributing timing signals throughout a vehicle, such as a land vehicle (automobile, truck, passenger bus), marine vehicle or airborne vehicle, for operation of the vehicle. The timing signals are provided by a signal antenna and associated receiver/processor that receive and process Satellite Positioning System (SATPS) signals from a plurality of SATPS satellites that move along orbits above the Earth. The SATPS signals from three or more SATPS satellites are received and analyzed to produce signal observation times, in local time or in a selected absolute time. These observation times are further processed to produce timing signals, or corrections for timing signals, that are distributed to other devices and components on the vehicle. The SATPS receiver/processor is, optionally, supplemented by an alternate timing device, such as a temperature-controlled and/or time-adjustable crystal oscillator whose timing output signals supplement or are corrected by the SATPS timing signals.

The timing signals are distributed to the vehicle engine, to any on-board telecommunications and business equipment, and/or to any other vehicle operations devices for full timing control on the vehicle. Because all timing signals are controlled by a single timing signal source, optionally supplemented by a correctable alternate timing signal source, uniform width timing signals are generated, corrected and distributed for all important timing on the vehicle and for timed telecommunication between the vehicle or a vehicle occupant and another vehicle or vehicle occupant.

DESCRIPTION OF BEST MODES OF THE INVENTION

Figure 1:
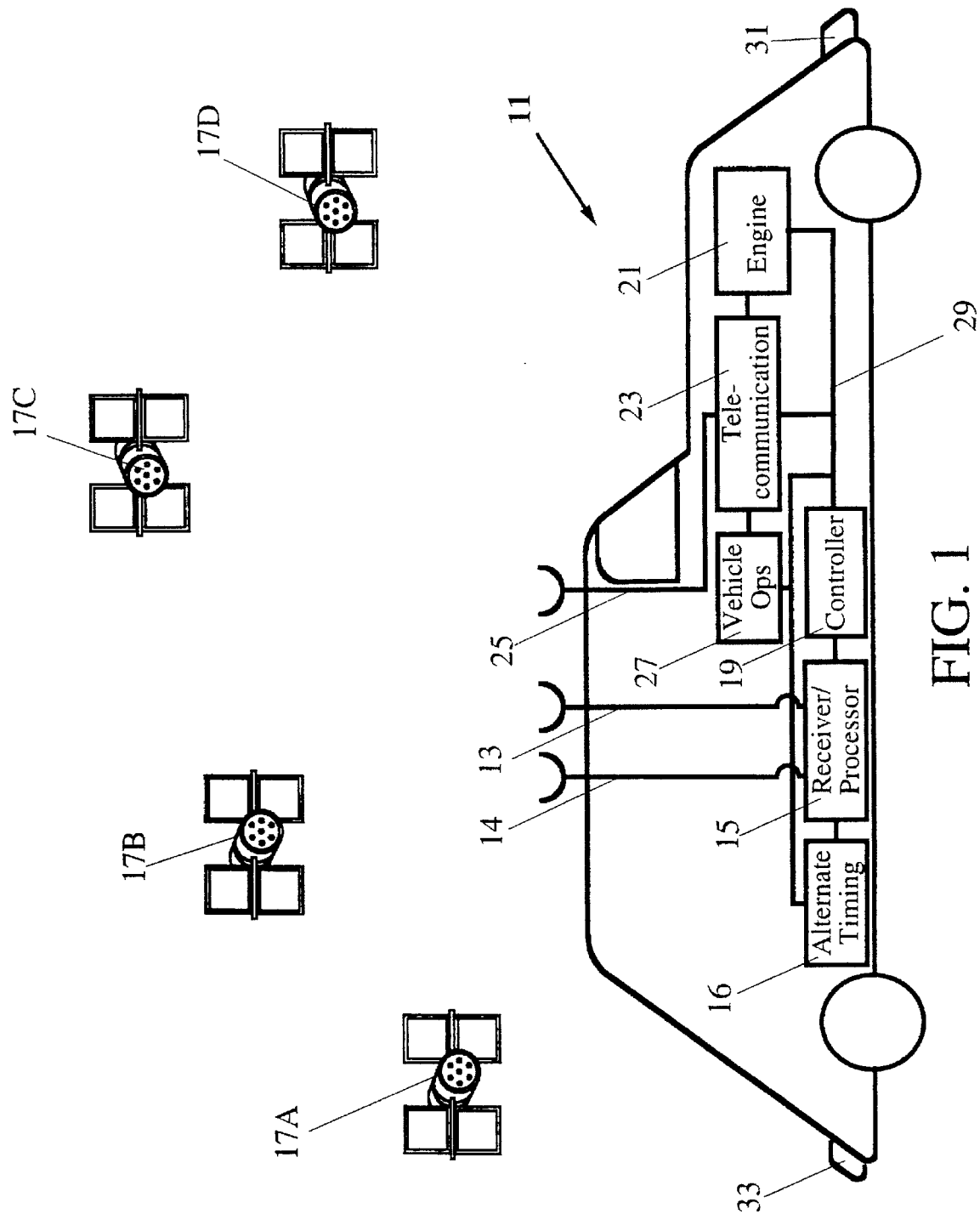
FIG. 1 is a schematic view of the invention in use aboard a land vehicle, shown here as an automobile.

FIG. 1, which is not drawn to scale, illustrates use of the invention in a land vehicle, here an automobile 11. An SATPS signal antenna 13 and associated SATPS receiver/processor 15 carried by the vehicle 11 receive and process SATPS signals from three or more SATPS satellites 17A, 17B, 17C and 17D. The SATPS signals may be generated and transmitted by satellites in a Global Positioning System (GPS), in a Global Orbiting Navigational Satellite System (GLONASS) or in any other suitable satellite-based location determination system. The GPS and a GLONASS location determination systems are discussed in detail later. In a first embodiment, the SATPS receiver/processor 15 receives the SATPS signals from the antenna 13 and generates a sequence of SATPS signal observation times $\{t_n\}_n$ that are approximately uniformly spaced and delivers these signals directly to a timing signal controller 19. The controller 19 makes appropriate adjustments in the timing signal sequence $\{t_n\}_n$ and delivers a possibly-modified timing signal sequence $\{t'_n\}_n$ to the vehicle engine 21 and/or to any timing-controlled telecommunications equipment and timing-controlled business equipment 23 and/or to any timing-controlled vehicle operations equipment 27, such as a vehicle clock, on the vehicle, using a timing signal bus 29 to distribute these timing signals. The on-board telecommunications equipment 23, if any, is optionally connected to a telecommunications antenna 25. The antenna 13 and/or the antenna 27 is preferably located on a roof or other exposed portion of the vehicle 11 that is most likely to be able to receive incoming satellite signals. Optionally, the antenna 13 and/or the antenna 28 may be located on a front bumper 31, on a rear bumper 33 or on any other suitable projection from the body of the vehicle 11.

The timing signal sequence $\{t'_n\}_n$ may be used to control the timing of: delivery of an ignition spark to an internal combustion engine; delivery of fuel to an internal combustion, turbine, diesel or stratified charge engine; generation and transmission of bit sequences or byte sequences for frames or packets sent elsewhere by an on-board asynchronous telecommunications device; receipt, buffering and analysis of bit sequences or byte sequences for frames or packets received from another transmitter located elsewhere by an on-board asynchronous telecommunications device; operation of an on-board microprocessor or other computer component; a timing device, such as a vehicle clock or alarm device, that supplements operation of the vehicle; and for any other related purpose for which timing signals are required.

Figure 2:
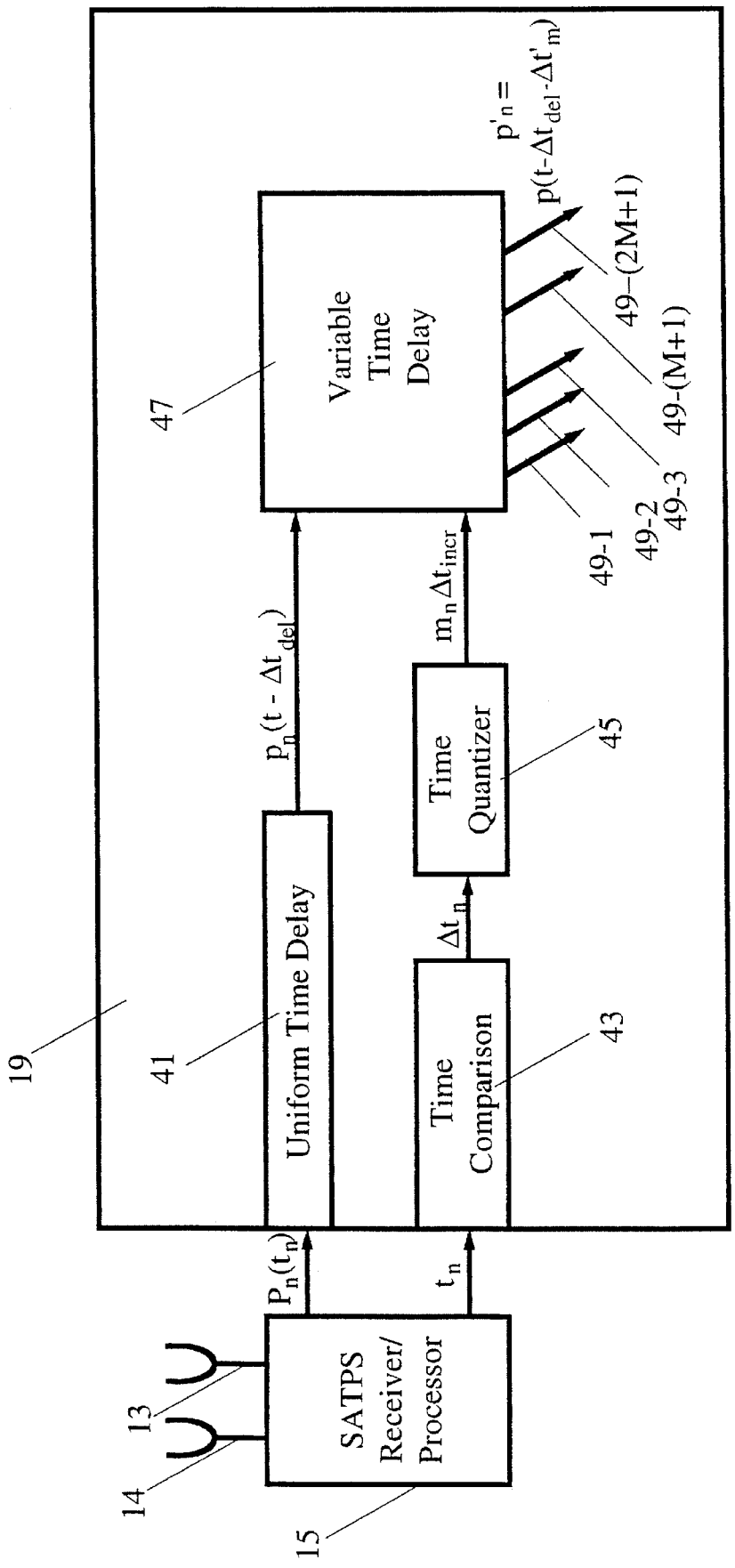
FIGS. 2 and 4 are schematic views of apparatus suitable for generating uniformly spaced timing signals as part of the invention.

FIG. 2 illustrates one approach for generation and issuance of a sequence $\{t'_n\}_n$ of timing signals with uniform spacing by the controller 19. The controller receives a "raw" sequence of pulse signals $\{p_n\}_n$ and the computed time $t_n$ associated with each such pulse signal from the SATPS receiver/processor 15. The pulse sequence $\{p_n\}_n$ is directed to a first time delay line 41 with an associated uniform time delay $\Delta t_{d1}$ that is preferably at least several microseconds (μsec), to allow time for analysis of the sequence $\{t_n\}_n$ of times that are received by a time comparison module 43. The time comparison module 43 forms a time difference $\Delta t_{pp,n} = t_n - t_{n-1}$ and subtracts a selected uniform target time $\Delta t_{target}$ from this time difference to form and issue a sequence of time adjustment intervals $$\Delta t_n = t_n - t_{n-1} \quad (n=1, 2, \ldots) \quad (1)$$

and to form and issue a sequence of time delay modification sums $$\Delta T_n = \sum_{r=1}^{n} \Delta t_r, \quad (2)$$

where $t_0$ is taken to be a time at which the timing control system is activated. The time $\Delta t_{incr}$ is preferably chosen so that, on average, about half the time adjustment intervals $\Delta t_n$ are positive and about half these time adjustment intervals are negative. However, a majority of the time intervals $\Delta t_n$ may be positive or may be negative. The sequence of time delay modification sums $\Delta T_n$ is received by a time quantizer module 45 (optional) that quantizes any time $\Delta T_n$ received by the module 45 into a positive or negative or zero integer multiple $m_n$ of a selected fraction of the target time increment $\Delta t_{incr}$. The integer $m_n$ may be positive, zero or negative, depending upon the sign and magnitude of the time delay modification sum $\Delta T_n$. The time increment $\Delta t_{incr}$ is preferably chosen to be small, of the order of 1 μsec or less, depending upon the intended use(s) for the timing pulse sequence.

The time delayed pulse sequence $\{p_n\}_n$ is received from the first time delay line 41 at a first input terminal of a second time delay line 47 having a plurality of 2 M+1 taps 49-1, 49-2, ..., 49-(M+1), ..., 49-(2 M+1) therein. Tap 49-(M+1) corresponds to "zero time delay" and tap 49-m (m=1, ..., 2 M+1) corresponds to a positive or negative time delay of $$\Delta t'_m = [m-(M+1)]\Delta t_{incr}. \quad (3)$$

Figure 3:
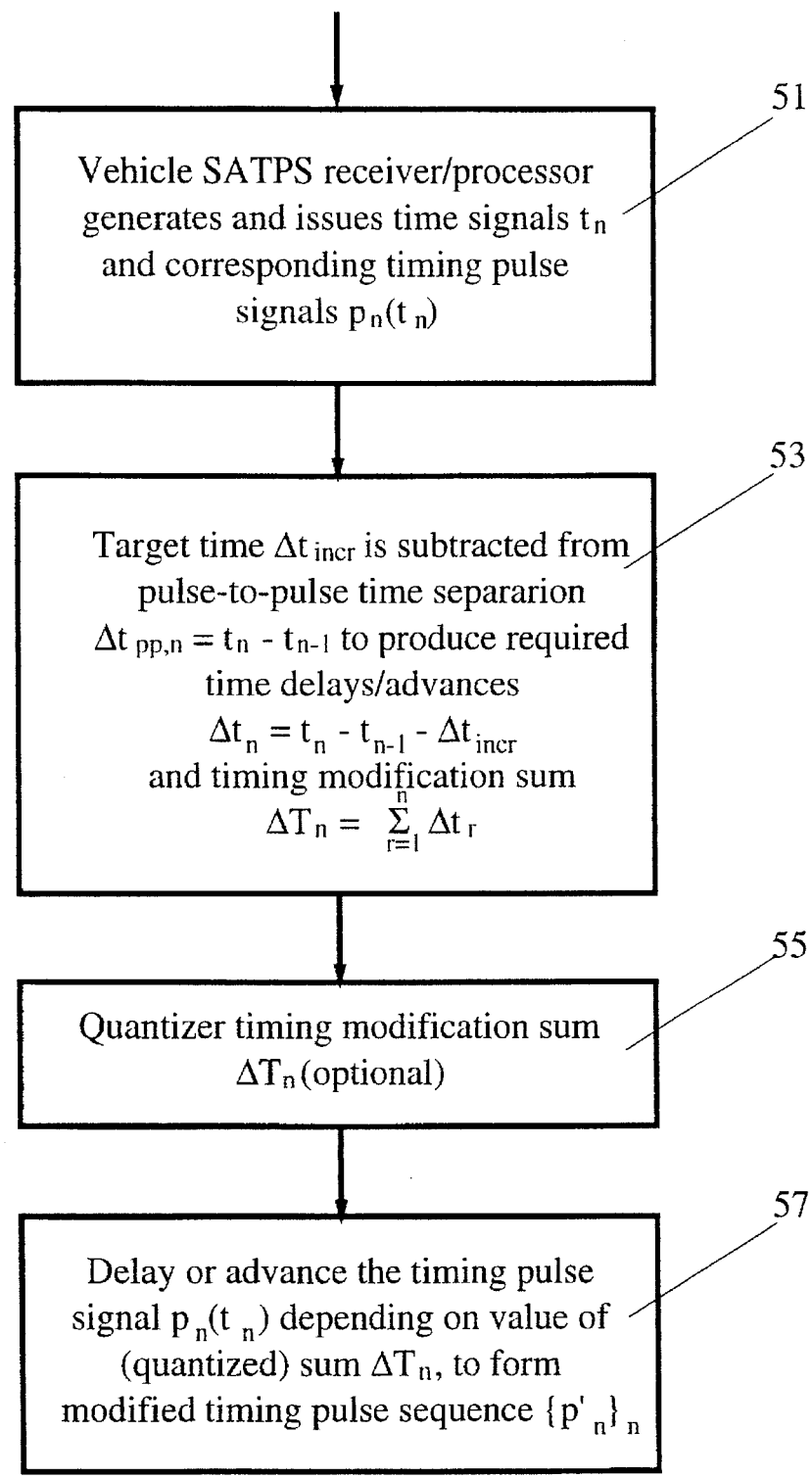
FIGS. 3, 5 and 6 illustrate, in flow chart form, procedures that may be used to practice the invention using the apparatus shown in FIGS. 2, 4 and 4, respectively.

The second time delay line 47 receives the sequence $\{m_n \cdot \Delta t_{incr}\}_n$ from the time quantizer module 45, or receives the sequence $\{\Delta T_n\}_n$ directly from the time comparison module 43, at a second input terminal and sets the tap delay m for the nth pulse $p_n$ equal to the integer $m_n$. The pulse signal $p_n$ now issues from an output terminal of the second time delay line 47 as a pulse signal $p'_n$ with a precisely defined time delay $\Delta t_{incr}$ relative to the preceding pulse signal $p'_{n-1}$, as desired. The modified sequence of pulse signals $\{p'_n\}_n$ is then used for timing control of the engine 21, business/telecommunications equipment 23 and/or supplementary vehicle operations equipment 27. The uniformly-spaced pulse signal sequence $\{p'_n\}_n$ can also be generated in other ways. A procedure that may be followed by the apparati shown in FIGS. 1 and 2 is illustrated in FIG. 3.

Figure 4:
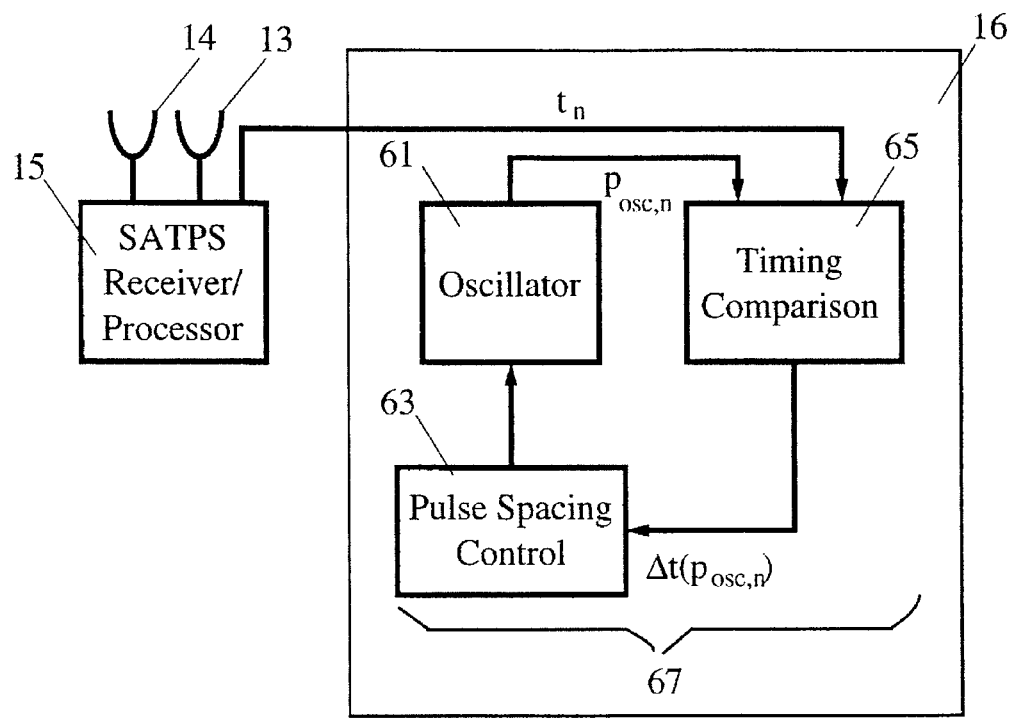
Figure 5:
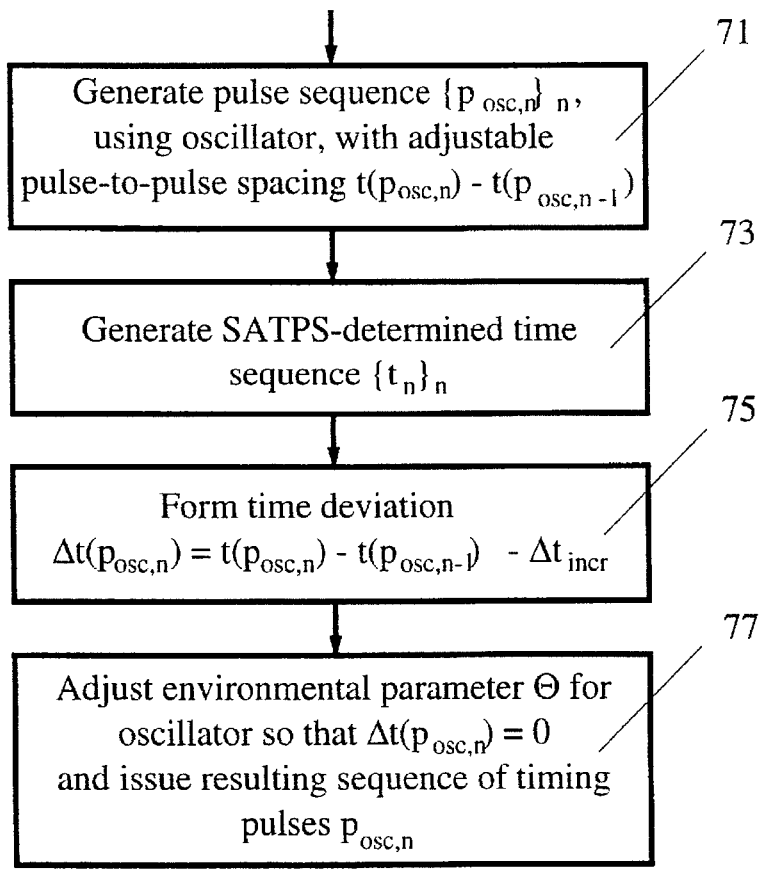
Figure 6:
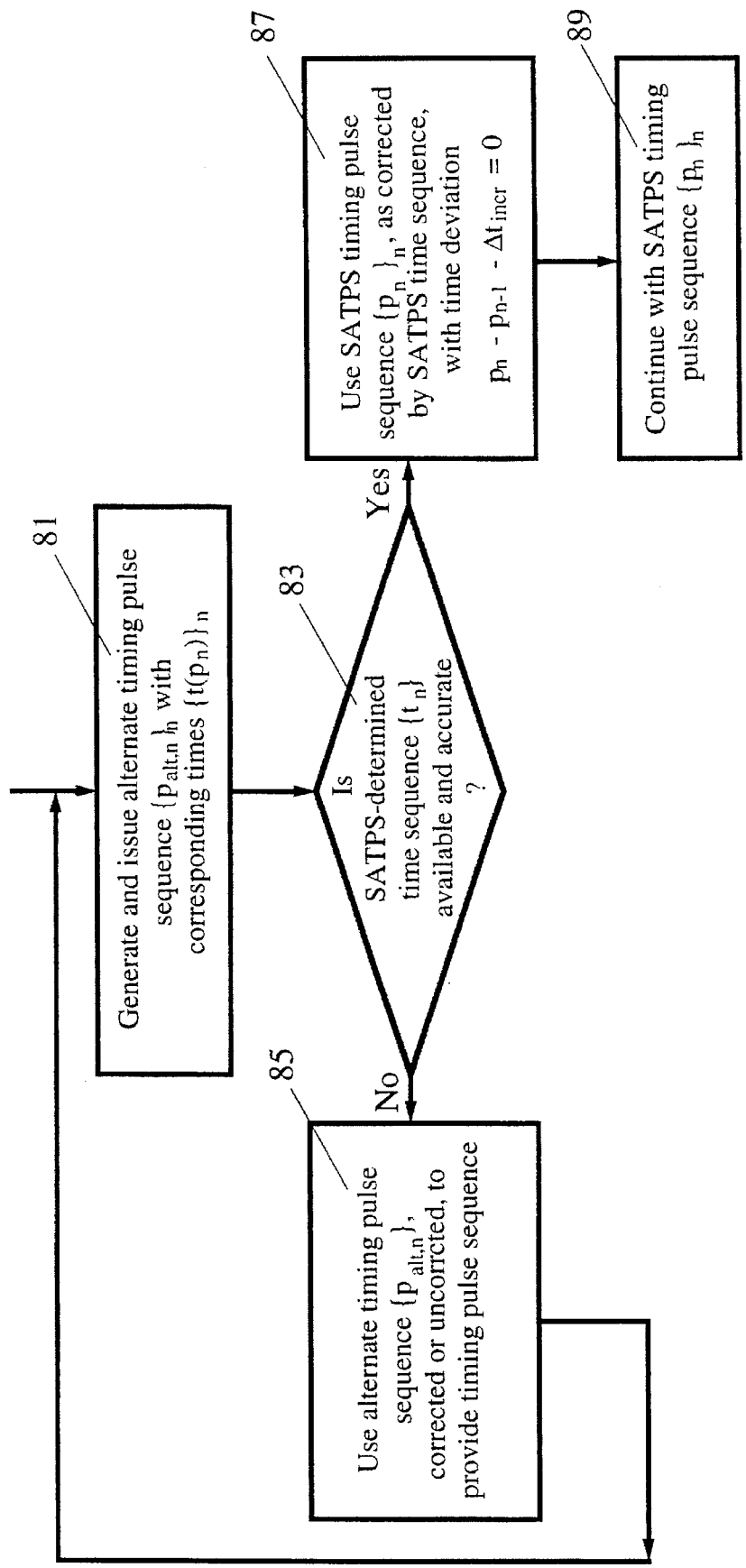

In a second embodiment of the invention, an alternate timing module 16 in FIG. 1 generates and issues a sequence of timing pulses, approximately uniformly spaced, and this sequence of timing pulses is continually corrected by the observation time sequence $\{t_n\}_n$ produced by the SATPS receiver/processor 15. Apparatus for such correction is illustrated in FIG. 4. The alternate timing module 16, in one version, includes a crystal oscillator or other adjustable oscillator 61 that generates and issues a sequence of output pulses $p_{osc,n}$ at times $t_{osc,n} = t(p_{osc,n})$ whose pulse-to-pulse time spacing, $t_{osc,n} - t_{osc,n-1}$, is controlled by a pulse spacing control module 63 that may rely upon control of an environmental parameter θ, such as the temperature or the relative electrical voltage or the electrical field, of the volume in which the oscillator 61 is located. A timing comparison module 65 receives the timing pulse sequence $\{p_{osc,n}\}_n$ at a first input terminal and the SATPS-determined observation time sequence $\{t_n\}_n$ at a second input terminal, determines the SATPS-determined time $t(p_{osc,n})$ associated with each crystal oscillator pulse signal, and forms the time deviation $$\Delta t(p_{osc,n}) = t(p_{osc,n}) - t(p_{osc,n-1}) - \Delta t_{incr}, \quad (4)$$

in a negative feedback loop 67, where $\Delta t_{incr}$ is the desired pulse-to-pulse time spacing. The pulse spacing control module 63 receives the SATPS-determined time difference $\Delta t(p_{osc,n})$ (which may be positive or negative or zero) and adjusts the relevant environmental parameter θ for the oscillator 61 to drive the time difference $\Delta t(p_{osc,n})$ to zero. The sequence of oscillator pulses $\{p_{osc,n}\}_n$ that issues from the feedback loop 67 is then used for timing control of the engine 21, business/telecommunications equipment 23 and/ or supplementary vehicle operations equipment 27. A procedure that may be followed by the apparati shown in FIGS. 1 and 4 is illustrated in FIG. 5.

Where the vehicle timing is first activated, or where code phase or carrier phase lock is temporarily lost by the SATPS antenna and SATPS receiver/processor on the vehicle, the alternate timing module can provide interim timing signals until the SATPS-based timing signals are (re)established and being used. In this situation, a device or instrument on the vehicle 11 that requires timing control causes the SATPS receiver/processor to be interrogated to determine if SATPS-determined time is available for generation or correction of a sequence of timing control pulses. If the SATPS-determined time is available, one of the procedures outlined above is followed. If the SATPS-determined time is not (yet) available,—for example, as system start-up, or when lock is temporarily lost, or when an insufficient number of SATPS satellites is available to provide an accurate SATPS-determined time sequence—an alternate timing module 16 (FIG. 3) provides a sequence of uncorrected timing pulse signals until the SATPS-determined time sequence becomes available. This procedure is illustrated in FIG. 6.

Where two or more stationary stations or moving stations (vehicles) must communicate with each other, the SATPS-determined observation time can be used to allow (1) asynchronous signal transmission, (2) synchronous signal transmission and (3) signal transmission by assigned time slots between the stations and vehicles. Each station or vehicle receives the SATPS signals, determines the SATPS signal observation times, and forms a sequence of preferably-uniformly-spaced timing signals as described in the preceding discussions. If asynchronous signal transmission is to be used, the on-board telecommunications equipment determines its own timing for signal transmission, without reference to any external standard except avoidance of signal collision.

Figure 7:
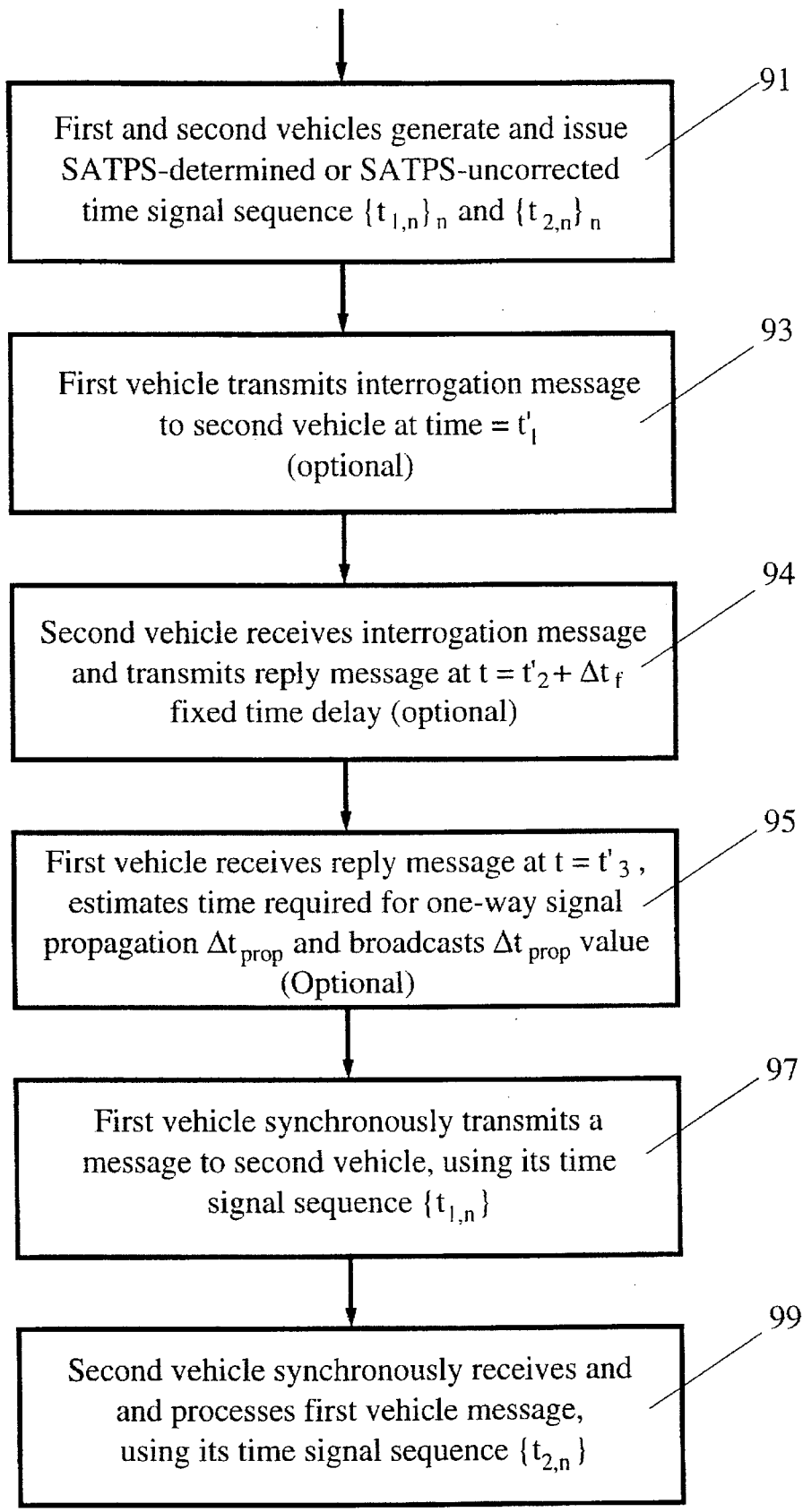
FIG. 7 illustrates, in flow chart form, a procedure for providing timing for synchronous transmission of signals between two spaced apart vehicles.

FIG. 7 illustrates a procedure that can be followed to provide synchronous or time slotted transmission of signals between two or more spaced apart vehicles. Corrected timing signals $t_{1,n}$ and $t_{2,n}$ are generated and issued by apparatus on first and second spaced apart vehicles, as discussed above, in step 91, preferably using the same basic timing increment $\Delta t_{incr}$. The two vehicles may receive the SATPS from different SATPS satellite constellations, and the corrected timing pulse signals for each vehicle may have slightly different times corresponding to these timing pulses. This time difference is unlikely to be greater than about 30 nsec, equivalent to an SATPS location error of about 10 meters. This pulse timing difference can be reduced to a pulse timing error of no more than 3 nsec if differential SATPS (DSATPS) signals are used to correct the measured pseudoranges, for SATPS signals arriving from each satellite, for local variation in the time delay for signal propagation in the ionosphere and in the troposphere and to cancel the effects of activation of the time dither associated with Selective Availability (SA) that might be introduced by the operator of the SATPS. Differential corrections of SATPS signals is discussed below for a Global Positioning System. These DSATPS signals can be received on a DSATPS antenna 14 (FIG. 1) and analyzed and used by the SATPS receiver/processor 15.

In step 97, the telecommunications equipment on a first vehicle senses its corrected timing pulse signals as before and transmits a message in accordance with the synchronous time standard (provided by the SATPS-determined or DSATPS-corrected time signals $t_{1,n}$ for each vehicle) and with the external standards for bit rate, message format, message size limitations, time slots and/or time for initial transmission agreed upon by the communicating stations and/or vehicles. In step 99, the telecommunications equipment on a second vehicle receives this transmitted message and determines the ordered bit content of the message, relying upon its own corrected SATPS-determined time signals $t_{2,n}$ and timing pulse signals.

If the signal propagation time from the first vehicle to the second vehicle must also be specified for time synchronization purposes, the procedure shown in FIG. 7 can be supplemented with an optional procedure, also shown in FIG. 7. In step 93, the first vehicle transmits an interrogation message having a recognizable format to the second vehicle, at a time $t=t'_1$. In step 94, the second vehicle receives the first part of this message at a time $t=t'_2$, processes the message, and transmits a reply message, also having a recognizable format, to the first vehicle at a time $t=t'_2+\Delta t_f$, where $\Delta t_f$ is an agreed upon, fixed time delay. In step 95, the first vehicle receives the reply message at time $t=t'_3$ ($>t'_2+\Delta t_f$) and estimates the one-way signal propagation time $\Delta t_{prop}$ as $$\Delta t_{prop}=(t'_3-t'_1-\Delta t_f)/2. \quad (5)$$

This estimate of signal propagation time from the first vehicle to the second vehicle (or from the second to the first) can be communicated to and be used by each vehicle that telecommunicates with the first vehicle. The telecommunicating vehicles need not be all land vehicles or all water vehicles or all airborne vehicles.

A Satellite Positioning System (SATPS) is a system of satellite signal transmitters, with receivers located on the Earth's surface or adjacent to the Earth's surface, that transmits information from which an observer's present location and/or the time of observation can be determined. Two operational systems, each of which qualifies as an SATPS, are the Global Positioning System and the Global Orbiting Navigational System.

The Global Positioning System (GPS) is part of a satellite-based navigation system developed by the United States Defense Department under its NAVSTAR satellite program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to two or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

An SATPS antenna receives SATPS signals from three or more (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS antenna from this information and from information on the ephemerides for each identified SATPS satellite. The SATPS signal antenna and signal receiver/processor are part of the user segment of a particular SATPS, the Global Positioning System, as discussed by Tom Logsdon in *The NAVSTAR Global Positioning System*, Van Nostrand Reinhold, 1992, pp. 17–90. The information from this material is incorporated by reference herein.

Each GPS satellite transmits two spread spectrum, L-band carrier signals: an L1 signal having a frequency f1=1575.42 MHz and an L2 signal having a frequency f2=1227.6 MHz. These two frequencies are integral multiples f1=1540 f0 and f2=1200 f0 of a base frequency f0=1.023 MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay$\propto$f$^{-2}$). This phenomenon is discussed by MacDoran in U.S. Pat. No. 4,463,357, which discussion is incorporated by reference herein. When transit time delay through the ionosphere is determined, a phase delay associated with a given carrier signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of 10 f0=10.23 MHz. A second PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision B, 3 Jul. 1991, which is incorporated by reference herein.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in Tom Logsdon, *The NAVSTAR Global Positioning System*, Van Nostrand Reinhold, New York, 1992.

A second configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of $8/17$ of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9 k/16) GHz and f2=(1.246+7 k/16) GHz, where k (=0, 1, 2, . . . , 23) is the channel or satellite number. These frequencies lie in two bands at 1.597–1.617 GHz (L1) and 1.240–1.260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at at rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. A single passive receiver of such signals is capable of determining receiver absolute position in an Earth-centered, Earth-fixed coordinate reference system utilized by the SATPS.

A configuration of two or more receivers can be used to accurately determine the relative positions between the receivers or stations. A first GPS station, whose location is known with high accuracy, receives GPS (or, more generally, SATPS) signals and determines the corrections that must be made to the signal received from each in-view satellite so that the GPS-determined location coordinates agree with the known location coordinates for the first station. The first GPS station then broadcasts these corrections for receipt and use by any nearby mobile GPS station to correct the GPS signals received by this mobile GPS station. This method, known as differential positioning, is far more accurate than absolute positioning, provided that the distances between these stations are substantially less than the distances from these stations to the satellites, which is the usual case. Differential positioning can be used for survey or construction work in the field, providing location coordinates and distances that may be accurate to within a few centimeters and are accurate to within 1–3 meters.

In differential position determination, many of the errors in the SATPS that compromise the accuracy of absolute position determination are similar in magnitude for stations that are physically close. The effect of these errors on the accuracy of differential position determination is therefore substantially reduced by a process of partial error cancellation.

Normally, the goal in use of SATPS signals and DSATPS signals is to provide one or more location fixes in which the location coordinates x, y and z (and, incidentally, the observation time or measurement time t) are determined that correspond to the location of the SATPS signal antenna when such a location fix and time fix are made. In these more conventional activities, the three location coordinates and the observation time coordinate are obtained from measurements of a plurality of M SATPS signals. If nothing is known about the location and the time, the integer M is usually required to be at least four. If the location of interest, corresponding to the location fix, is on a known surface, expressed as $z=f(x,y)$ for some reasonably well behaved two-place function f, where x, y and z are independent location coordinates, the integer M may be as low as three. If the location of interest is on a known space curve, expressed as $x=f_1(z)$ and $y=f_2(z)$, where $f_1$ and $f_2$ are reasonably well behaved functions, the integer M may be as low as two. From practical considerations, it is likely that SATPS signals from $M \geq 3$ satellites are required for many situations of interest.

Here, the concern is determination of the observation time t, or the equivalent distance c't., where c' is the velocity of electromagnetic signal propagation in the ambient medium; for signal propagation in a tenuous medium such as air, $c' \approx 3 \times 10^8$ meters/sec. The inaccuracy in c't is often determined by, and of the same order of magnitude as, the inaccuracies associated with determination of the location indicated by these measurements. Ordinary GPS signals, in the absence of activation of intentional time dither associated with Selective Availability, have an inherent inaccuracy estimated as 10–20 meters, which corresponds to a temporal inaccuracy of about 33–67 nsec. If differential GPS corrections are used, the location inaccuracy can be reduced to 1–2 meters (or less in some circumstances), which corresponds to a temporal inaccuracy of 3–7 nsec.

We claim:

1. Apparatus for providing timing signals for operation of a vehicle, the apparatus comprising:

a Satellite Positioning System (SATPS) signal antenna and SATPS signal receiver/processor, connected together and positioned on a vehicle, to receive and process SATPS signals from at least three SATPS satellites and to determine and issue a first sequence of timing pulse signals and a second sequence of pulse time signals, where each pulse time signal in the second sequence indicates the time at which a timing pulse signal in the first sequence is issued;

timing pulse modification means for receiving the first sequence of timing pulse signals and the second sequence of pulse time signals and for generating and issuing a third sequence of timing pulse signals, where any two consecutive timing pulse signals in the third sequence are spaced apart by a time interval $\Delta t_3$ that is approximately equal to a selected time difference $\Delta t_{incr}$; and timing pulse distribution means for receiving the third sequence of timing pulse signals and for delivering these signals to a timing-controlled instrument that is positioned on the vehicle, where the timing-controlled instrument is drawn from the class of such instruments consisting of: an engine to provide motional power for the vehicle; a telecommunications instrument to transmit a telecommunications signal from the vehicle to a telecommunications instrument that is spaced apart from the vehicle; a telecommunications instrument to receive a telecommunications signal at the vehicle from a telecommunications instrument that is spaced apart from the vehicle; a computer microprocessor that is positioned on and can be used on the vehicle; a computer clock that provides timing signals for a computer that is positioned on the vehicle; a visually perceptible or audibly perceptible clock that is positioned on the vehicle.

2. The apparatus of claim 1, further comprising supplementary clock means, connected to said SATPS receiver/ processor and to said timing pulse distribution means, for generating and issuing a fourth sequence of timing pulses that are spaced apart in time by a selectable time interval $\Delta t_4$ that is approximately equal to said selected time difference $\Delta t_{incr}$, where said timing pulse distribution means accepts and delivers the fourth sequence of timing pulse signals to at least one of said timing controlled instruments whenever said third sequence of timing pulse signals is unavailable.

3. The apparatus of claim 1, further comprising signal correction means for receiving differential corrections of SATPS signals that, when combined with said SATPS signals, provides at least one time fix that has an inaccuracy of at most about 3 nanoseconds.

4. The apparatus of claim 1, wherein said timing controlled instrument is a telecommunications instrument that generates and transmits radiowave signals from said vehicle to a radiowave receiver that is spaced apart from said vehicle, using signal transmission that is drawn from the class of signal transmission procedures consisting of asynchronous signal transmission, synchronous signal transmission and transmission of signals during one or more assigned time slots.

5. The apparatus of claim 1, wherein said timing controlled instrument is a telecommunications instrument that receives radiowave signals at a radiowave receiver on said vehicle from a transmitter that is spaced apart from said vehicle, using signal transmission that is drawn from the class of signal transmission procedures consisting of asynchronous signal transmission, synchronous signal transmission and transmission of signals during one or more assigned time slots.

6. The apparatus of claim 1, wherein said Satellite Positioning System is drawn from the class of satellite-based location and time determination systems consisting of Global Positioning Systems and Global Orbiting Navigational Satellite Systems.

7. Apparatus for providing timing signals for operation of a vehicle, the apparatus comprising:

a Satellite Positioning System (SATPS) signal antenna and SATPS signal receiver/processor, connected together and positioned on a vehicle, to receive and process SATPS signals from at least three SATPS satellites and to determine and issue a first sequence of time signals at which a time fix is made;

supplementary timing means, for generating and issuing a second sequence of timing pulses that are spaced apart in time by a selectable time interval $\Delta t_2$, for receiving the first sequence of time signals from the SATPS receiver/processor, for using the first sequence of signals to adjust the selectable time interval value $\Delta t_2$ so that this time interval value is approximately equal to a selected time difference $\Delta t_{incr,2}$; and timing pulse distribution means for receiving the third sequence of timing pulse signals and for delivering these signals to a timing-controlled instrument that is positioned on the vehicle, where the timing-controlled instrument is drawn from the class of such instruments consisting of: an engine to provide motional power for the vehicle; a telecommunications instrument to transmit a telecommunications signal from the vehicle to a telecommunications instrument that is spaced apart from the vehicle; a telecommunications instrument to receive a telecommunications signal at the vehicle from a telecommunications instrument that is spaced apart from the vehicle; a computer microprocessor that is positioned on and can be used on the vehicle; a computer clock that provides timing signals for a computer that is positioned on the vehicle; a visually perceptible or audibly perceptible clock that is positioned on the vehicle.

8. The apparatus of claim 7, wherein said supplementary timing means comprises:

oscillator means for generating and issuing said second sequence of timing pulses that are spaced apart in time by said time interval value $\Delta t_2$, where said time interval value can be adjusted by varying a selected parameter $\theta$ of the environment in which the oscillator means is immersed;

timing pulse comparison means, for receiving said first, second and third sequences of signals from said SATPS receiver/processor and the oscillator means, for determining and issuing a time interval difference $\Delta t_{diff} = \Delta t_2 - \Delta t_3$, where $\Delta t_3$ is a selected time interval value; and pulse spacing control means, connected to the oscillator means, for receiving the time interval difference signal $\Delta t_{diff}$ and, if the magnitude of this signal $\Delta t_{diff}$ is non-zero, for adjusting the selected environmental parameter $\theta$ of the oscillator means to decrease the magnitude of the signal $\Delta t_{diff}$.

9. The apparatus of claim 7, further comprising signal correction means for receiving differential corrections of SATPS signals that, when combined with said SATPS signals, provides at least one time fixes that has an inaccuracy of at most about 3 nanoseconds.

10. The apparatus of claim 7, wherein said timing controlled instrument is a telecommunications instrument that generates and transmits radiowave signals from said vehicle to a radiowave receiver that is spaced apart from said vehicle, using signal transmission that is drawn from the class of signal transmission procedures consisting of asynchronous signal transmission, synchronous signal transmission and transmission of signals during one or more assigned time slots.

11. The apparatus of claim 7, wherein said timing controlled instrument is a telecommunications instrument that receives radiowave signals at a radiowave receiver on said vehicle from a transmitter that is spaced apart from said vehicle, using signal transmission that is drawn from the class of signal transmission procedures consisting of asynchronous signal transmission, synchronous signal transmission and transmission of signals during one or more assigned time slots.

12. The apparatus of claim 7, wherein said Satellite Positioning System is drawn from the class of satellite-based location and time determination systems consisting of Global Positioning Systems and Global Orbiting Navigational Satellite Systems.

13. A method for providing timing signals for operation of a vehicle, the method comprising the steps of:

providing a Satellite Positioning System (SATPS) signal antenna and SATPS signal receiver/processor, connected together and positioned on a vehicle, to receive and process SATPS signals from at least three SATPS satellites and to determine and issue a first sequence of timing pulse signals and a second sequence of pulse time signals, where each pulse time signal in the second sequence indicates the time at which a timing pulse signal in the first sequence is issued;

receiving the first sequence of timing pulse signals and the second sequence of pulse time signals, and generating and issuing a third sequence of timing pulse signals, where any two consecutive timing pulse signals in the third sequence are spaced apart by a time interval $\Delta t_3$ that is approximately equal to a selected time difference $\Delta t_{incr}$; and delivering this third sequence to a timing-controlled instrument that is positioned on the vehicle, where the timing-controlled instrument is drawn from the class of such instruments consisting of: an engine to provide motional power for the vehicle; a telecommunications instrument to transmit a telecommunications signal from the vehicle to a telecommunications instrument that is spaced apart from the vehicle; a telecommunications instrument to receive a telecommunications signal at the vehicle from a telecommunications instrument that is spaced apart from the vehicle; a computer microprocessor that is positioned on and can be used on the vehicle; a computer clock that provides timing signals for a computer that is positioned on the vehicle; a visually perceptible or audibly perceptible clock that is positioned on the vehicle.

14. The method of claim 13, further comprising the step of providing a supplementary clock means, connected to said SATPS receiver/processor and to said timing pulse distribution means, for generating and issuing a fourth sequence of timing pulses that are spaced apart in time by a selectable time interval $\Delta t_4$ that is approximately equal to said selected time difference $\Delta t_{incr}$, where said timing pulse distribution means accepts and delivers the fourth sequence of timing pulse signals to at least one of said timing controlled instruments whenever said third sequence of timing pulse signals is unavailable.

15. The method of claim 13, further comprising the step of providing differential corrections of SATPS signals that, when combined with said SATPS signals, provides at least one time fix that has an inaccuracy of at most about 3 nanoseconds.

16. The method of claim 13, further comprising the step of choosing said timing controlled instrument to be a telecommunications instrument that generates and transmits radiowave signals from said vehicle to a radiowave receiver that is spaced apart from said vehicle, using signal transmission that is drawn from the class of signal transmission procedures consisting of asynchronous signal transmission, synchronous signal transmission and transmission of signals during one or more assigned time slots.

17. The method of claim 13, further comprising the step of choosing said timing controlled instrument to be a telecommunications instrument that receives radiowave signals at a radiowave receiver on said vehicle from a transmitter that is spaced apart from said vehicle, using signal transmission that is drawn from the class of signal transmission procedures consisting of asynchronous signal transmission, synchronous signal transmission and transmission of signals during one or more assigned time slots.

18. The method of claim 13, further comprising the step of choosing said Satellite Positioning System from the class of satellite-based location and time determination systems consisting of Global Positioning Systems and Global Orbiting Navigational Satellite Systems.

19. A method for providing timing signals for operation of a vehicle, the method comprising the steps of:

(1) providing a Satellite Positioning System (SATPS) signal antenna and SATPS signal receiver/processor, connected together and positioned on a vehicle, to receive and process SATPS signals from at least three SATPS satellites and to determine and issue a first sequence of timing pulse signals and a second sequence of pulse time signals, where each pulse time signal in the second sequence indicates the time at which a timing pulse signal in the first sequence is issued;

(2) generating and issuing a second sequence of timing pulses that are spaced apart in time by a selectable time interval $\Delta t_2$;

(3) receiving the first sequence of time signals from the SATPS receiver/processor, and using the first sequence of signals to adjust the selectable time interval value $\Delta t_2$ so that this time interval value is approximately equal to a selected time difference $\Delta t_{incr,2}$; and (4) delivering this third sequence to a timing-controlled instrument that is positioned on the vehicle, where the timing-controlled instrument is drawn from the class of such instruments consisting of: an engine to provide motional power for the vehicle; a telecommunications instrument to transmit a telecommunications signal from the vehicle to a telecommunications instrument that is spaced apart from the vehicle; a telecommunications instrument to receive a telecommunications signal at the vehicle from a telecommunications instrument that is spaced apart from the vehicle; a computer microprocessor that is positioned on and can be used on the vehicle; a computer clock that provides timing signals for a computer that is positioned on the vehicle; a visually perceptible or audibly perceptible clock that is positioned on the vehicle.

20. The method of claim 19, wherein said step (2) comprises providing an oscillator for generating and issuing said second sequence of timing pulses that are spaced apart in time by said time interval value $\Delta t_2$, where said time interval value can be adjusted by varying a selected parameter $\theta$ of the environment in which the oscillator is immersed.

21. The method of claim 20, wherein said step (3) comprises:

(3a) providing timing pulse comparison means, for receiving said first, second and third sequences of signals from said SATPS receiver/processor and the oscillator means, for determining and issuing a time interval difference $\Delta t_{diff} = \Delta t_2 - \Delta t_3$, where $\Delta t_3$ is a selected time interval value; and (3b) providing pulse spacing control means, connected to said oscillator, for receiving the time interval difference signal $\Delta t_{diff}$ and, if the magnitude of this signal $\Delta t_{diff}$ is non-zero, for adjusting the selected environmental parameter $\theta$ of the oscillator means to decrease the magnitude of the signal $\Delta t_{diff}$.

22. The method of claim 19, further comprising the step of providing differential corrections of SATPS signals that, when combined with said SATPS signals, provides at least one time fix that has an inaccuracy of at most about 3 nanoseconds.

23. The method of claim 19, further comprising the step of choosing said timing controlled instrument to be a telecommunications instrument that generates and transmits radiowave signals from said vehicle to a radiowave receiver that is spaced apart from said vehicle, using signal transmission that is drawn from the class of signal transmission procedures consisting of asynchronous signal transmission, synchronous signal transmission and transmission of signals during one or more assigned time slots.

24. The method of claim 19, further comprising the step of choosing said timing controlled instrument to be a telecommunications instrument that receives radiowave signals at a radiowave receiver on said vehicle from a transmitter that is spaced apart from said vehicle, using signal transmission that is drawn from the class of signal transmission procedures consisting of asynchronous signal transmission, synchronous signal transmission and transmission of signals during one or more assigned time slots.

25. The method of claim 19, further comprising the step of choosing said Satellite Positioning System from the class of satellite-based location and time determination systems consisting of Global Positioning Systems and Global Orbiting Navigational Satellite Systems.

* * * * *